United States Patent [19]

Borg

[11] Patent Number: 4,525,740
[45] Date of Patent: Jun. 25, 1985

[54] TV RECEIVER WITH MULTIPLEXED MICROPROCESSOR KEYBOARD SCANNING AND CHANNEL NUMBER DISPLAY

[75] Inventor: Arthur N. Borg, Lake Forest, Ill.

[73] Assignee: Zenith Electronics Corporation, Glenview, Ill.

[21] Appl. No.: 381,110

[22] Filed: May 24, 1982

[51] Int. Cl.³ .......................... H04N 5/44; H04N 5/50
[52] U.S. Cl. ................................. 358/192.1; 455/154; 455/161
[58] Field of Search .......................... 358/192.1, 191.1; 455/179, 186, 154, 158, 161

[56] References Cited

U.S. PATENT DOCUMENTS 4,387,440 6/1983 Borg ................................. 358/191.1

Primary Examiner—Tommy P. Chin

[57] ABSTRACT

A system eliminates digital switching video noise by performing several microprocessor controlled operations in a television receiver during the vertical retrace interval. A microprocessor maintained in an idle state until detection of a vertical retrace pulse initiates channel selector keyboard scan, channel number display update, and phase locked loop tuning information update during the vertical interval by multiplexing control outputs therefrom on a limited number of microprocessor IC pins. This approach provides for the regular and continuous updating of television receiver operating parameters while eliminating digital switching noise from the receiver's video display generated by the transfer of digital data representing the aforementioned operating parameters.

13 Claims, 2 Drawing Figures

TV RECEIVER WITH MULTIPLEXED MICROPROCESSOR KEYBOARD SCANNING AND CHANNEL NUMBER DISPLAY

CROSS-REFERENCE TO RELATED PATENT

This application is related to the following patent which is assigned to the assignee of the present application: U.S. Pat. No. 4,387,400, issued June 7, 1983, entitled "Tuning System For A Television Receiver", in the name of the present applicant.

BACKGROUND OF THE INVENTION

This invention relates generally to television receivers and is specifically directed to a system for improving the video display in a microprocessor controlled television receiver.

Keyboard tuning which has been available in color television receivers is now finding its way into cheaper, black and white television receivers. This approach to channel selection is generally faster, more accurate, and offers longer useful lifetimes of the components utilized therein. The selected channel number may be displayed either temporarily following channel selection on a portion of the video display itself, or by means of a continuous, multi-segment, two digit, light emitting diode (LED) display.

With keyboard channel section has come the utilization of microprocessors for controlling such functions as tuning, channel number display, television receiver remote control, and an ever increasing number of television receiver functions. Microprocessors have the advantage of being small, low power consumption devices which are programmable by operator-initiated instructions for executing mathematical algorithms on the data supplied to the microprocessor. The microprocessor is capable of high speed execution of a set of instructions and providing output data during execution which may be used to control various operating modes and parameters of the television receiver. Data instructions are input to and output from the microprocessor at extremely high rates and frequently on the same lines in order to minimize system cost and complexity by limiting the number of pins of the microprocessor.

The digital switching necessary for data transfer to and from the microprocessor unfortunately generates noise which may degrade the video display of the television receiver. In a black and white television receiver which is vertically synchronized with the 60 Hz VAC input power line, this problem may be avoided by driving one light emitting diode (LED) display, such as the units element, during the first half cycle, and a second LED display, e.g., the tens digit, during the second half cycle. Unfortunately this approach will not solve the problem in a color television receiver where the actual vertical rate is 59.94 Hz. Thus, an attempt to synchronize (sync) LED display drive signals with the AC input line will result in the continuous vertical rolling of a noise band appearing in the form of a horizontal speckled line across the faceplate of the cathode ray tube (CRT).

One attempt at reducing this source of video display degradation involves the use of choke coils each coupled in circuit with an LED segment for filtering out this digital switching noise from the video signals displayed on the CRT's faceplate. This approach, however, is undesirable in that it overly complicates LED drive circuitry and substantially increases channel number display system cost. Another approach makes use of a latched channel number display in which a separate integrated circuit is provided with selected channel number information which is latched into this integrated circuit for later transfer out to the channel number digits display. This too is an expensive solution to the problem since fourteen LED segment lines and associated pins on the integrated circuit latch are required. In addition, this approach requires a dedicated integrated circuit which substantially increases system cost.

The present invention is intended to overcome the aforementioned limitations of the prior art by providing a system for scanning a channel selector keyboard and driving an LED channel number display by means of a microprocessor in a television receiver without degrading its video display with high frequency digital switching noise.

OBJECTS OF THE INVENTION

Accordingly, it is an object of the present invention to improve the video display of a television receiver.

Another object of the present invention is to improve the video display in a microprocessor controlled television receiver by eliminating digital switching noise therefrom.

A further object of the present invention is to reduce the cost and complexity of a digital control system in a television receiver while improving video display quality.

Still another object of the present invention is to provide a keyboard channel selection and light emitting diode channel number display arrangement controlled by a microprocessor which does not inject digital switching noise into the displayed video signals resulting in the degradation thereof.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1:
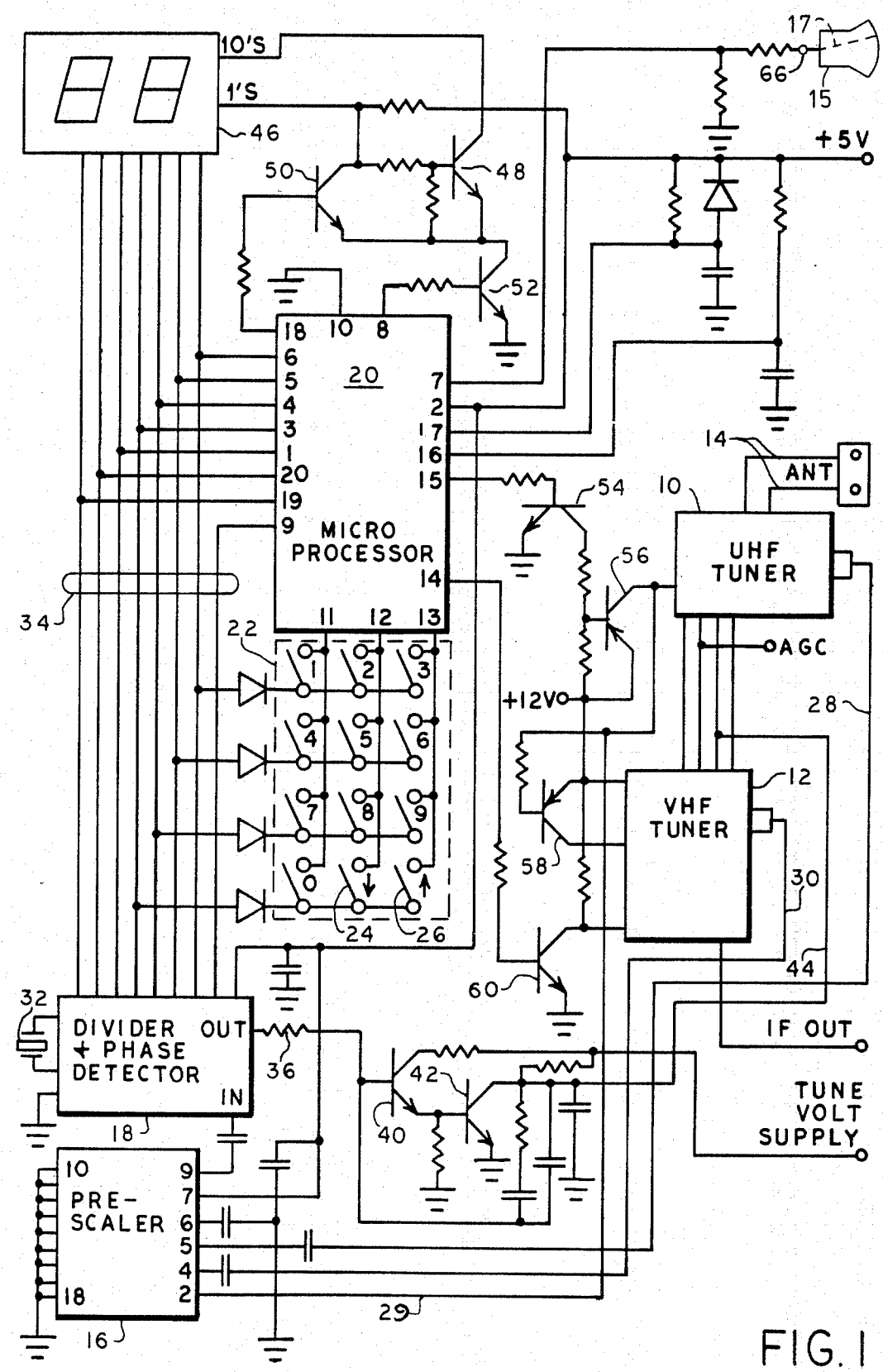
FIG. 1 is a combination schematic and simplified block diagram of a television receiver with multiplexed keyboard scanning and channel number display in accordance with a preferred embodiment of the present invention.

Referring to FIG. 1, there is shown in simplified block and schematic diagram form a multiplexed keyboard scanning and channel number display system for use in a microprocessor controlled television receiver. Also shown in FIG. 1 is a tuning system for tuning the local oscillator of a UHF tuner 10 and a VHF tuner 12 upon selection of a desired channel number on keyboard 22. These tuners receive television signals via a pair of leads 14 which are conventionally coupled to an antenna (not shown). An 8-bit port of microprocessor 20 has the capability of sourcing current to a light emitting diode (LED) display 46. This port also strobes the keyboard 22 and outputs digital address and data information to the phase locked loop 18 in sequential order. The other lines read keyboard 22, output tuning band information and synchronize the entire system to the vertical retrace period with the vertical retrace signal provided to the system via input terminal 66.

More particularly, to tune the local oscillators in the tuners 10 and 12, a frequency synthesizer is included. The synthesizer includes a pre-scaler 16, a divider and phase detector 18, and a logic circuit in the form of a microprocessor 20. Coupled to the microprocessor is a keyboard 22 which includes ten channel selection keys or switches. Adjacent each key is a single digit number to identify the channel number which can be selected by actuation of the key. For example, if channel 32 is to be selected, the viewer closes keys 3 and 2. If a single digit channel is to be selected, the present embodiment requires that the zero key be actuated first, and then the key associated with the desired channel. Thus, the keys zero and seven would be actuated to select channel seven.

A different channel can also be selected by closing a channel-down key 24 or a channel-up key 26. For example, when the key 26 is closed, ascending channel numbers are selected and tuned to sequentially. When a desired channel number is arrived at, the key 26 is opened and the receiver remains tuned to that desired channel. The channel-down key 24 operates in a like manner for selecting descending channel numbers.

As described below, the present invention also uses one of the ten channel selection keys as a fine tuning selection and keys 24 and 26 for selecting the direction of fine tuning.

Assuming that the viewer has actuated one or more of the keys to select a channel, tuning of the oscillators occurs as follows. Leads 28 and 30 carry local oscillator signals from the tuners 10 and 12, respectively, to input pins 4 and 5 of the pre-scaler 16. Another lead 29 indicates to the pre-scaler whether to process the signal at pin 4 or the signal at pin 5, depending on which tuner is operative. Assuming that the UHF tuner is operative, the pre-scaler 16 divides the local oscillator signal at pin 5 by a fixed number such as 256, and outputs the pre-scaled oscillator signal at pin 9.

The divider and phase detector device 18 receives the pre-scaled oscillator signal at its input in addition to a reference oscillator signal developed by a crystal 32. The device 18 divides the reference frequency by a number R which is determined by the microprocessor 20 and supplied to the divider and phase detector 18 via leads 34. The number R is fixed except when a fine tuning mode has been selected by the viewer.

The leads 34 carry information from the microprocessor 20 for instructing the device 18 to divide the pre-scaled oscillator signal by a number P. The latter number is determined by the microprocessor sensing which channel selection keys have been closed in the keyboard 22.

After dividing the reference frequency by the number R and dividing the pre-scaled oscillator signal by the number P, the device 18 compares the two divided signals to each other. Any deviation from equality is assumed to be caused by mis-tuning of the UHF tuner's oscillator, wherefore, the device 18 outputs a correction signal at its output terminal.

The correction output by the divider and phase detector 18 is coupled via a resistor 36 to transistors 40 and 42 and their associated circuitry for amplifying, integrating and filtering the correction signal. The filtered output of transistor 42 is then coupled via a lead 44 to the tuner 10 for correcting the frequency of that tuner's local oscillator. A similar sequence of events occurs when the VHF tuner 12 is being tuned.

To identify which channel the receiver is tuned to, a digital display 46 is included. This display includes a pair of digits which are illuminated under the control of the microprocessor 20. Specifically, the tens digit of the display 46 is coupled to the collector of a transistor 48 which is driven by another transistor 50 from pin 18 of the microprocessor. The units digit of the display is connected to the collector of the transistor 50. In response to the information provided by the microprocessor, the transistors 48 and 50 select the correct tens and units digit for illumination.

The on and off time of the display 46 is controlled by another transistor 52 whose base is coupled to pin 8 of the microprocessor. Whenever pin 8 goes high, the transistor 52 conducts to turn on the display.

Another function of the microprocessor is to select either the UHF tuner or the VHF tuner for operation, depending on the channel selected by the viewer. This is accomplished by coupling pin 15 of the microprocessor to the tuners via transistors 54, 56 and 58. Thus, the UHF tuner is turned off and the VHF tuner is turned on, or vice versa.

When the VHF tuner is selected, another transistor 60 which is coupled to pin 14 of the microprocessor selects either the high band of VHF channels (channels 7-13) or the low band of VHF channels (channels 2-6).

The operation described immediately above is largely conventional. The description which follows illustrates how fine tuning is achieved and how injection of noise into the video image is avoided.

In the keyboard 22, each of the channel selection keys is associated with an integer zero through nine. As described previously, the illustrated embodiment requires that a single digit channel (channel 7, for example) be selected by first closing the selection key zero and by then closing the channel selection key associated with the desired single digit channel. One of the channel selection keys also functions as a fine tuning selection key. This fine tuning selection key is, when it functions as a channel select key, associated with a channel number N, where N does not correspond to the first digit of a two digit channel. Preferably, the channel 9 key is selected to function both as a channel selection key and as a fine tuning selection key.

When a viewer wishes to fine tune the receiver, the channel 9 key is closed without first closing the zero key. The microprocessor is programmed to interpret this action as a request for fine tuning, and it actuates the display 46 to give an indication that the receiver is in a fine tuning mode. This is preferably accomplished by causing the letter F to be displayed.

With the system now in a fine tuning mode, the channel-up key 26 and the channel-down key 24 no longer function to select ascending or descending channels. Instead, the microprocessor now responds to the actuation of either the channel-up key 26 or the channel-down key 24 for implementing the requested fine tuning. In addition, the microprocessor is selected to undertake its digital switching chores only at the initiation of a vertical interval so that any noise resulting from digital switching does not occur during the receiver's active scan time. Hence, digitally induced noise is eliminated from the television image. A detailed description of this fine tuning operation is included in the aforementioned related patent and is not further described herein since it is not a part of the present invention.

The manner in which user initiated inputs to keyboard 22 are detected and selected channel numbers are presented on digital display 46 will now be described with reference to FIG. 1 and the flow chart shown in FIG. 2. This flow chart depicts the programming of the microprocessor 20 in a general way and does not include reference to the common, standard routines executed in a typical microprocessor such as internal data transfer and housekeeping functions. The details of the entire program for a COP411 single-chip N-channel microprocessor manufactured by National Semiconductor which is utilized in a preferred embodiment of the present invention is illustrated in Table I. In referring to FIG. 2, an oval symbol indicates the start of an operational sequence, a diamond indicates a decision point, and a rectangle indicates the performance of an operation.

Figure 2:
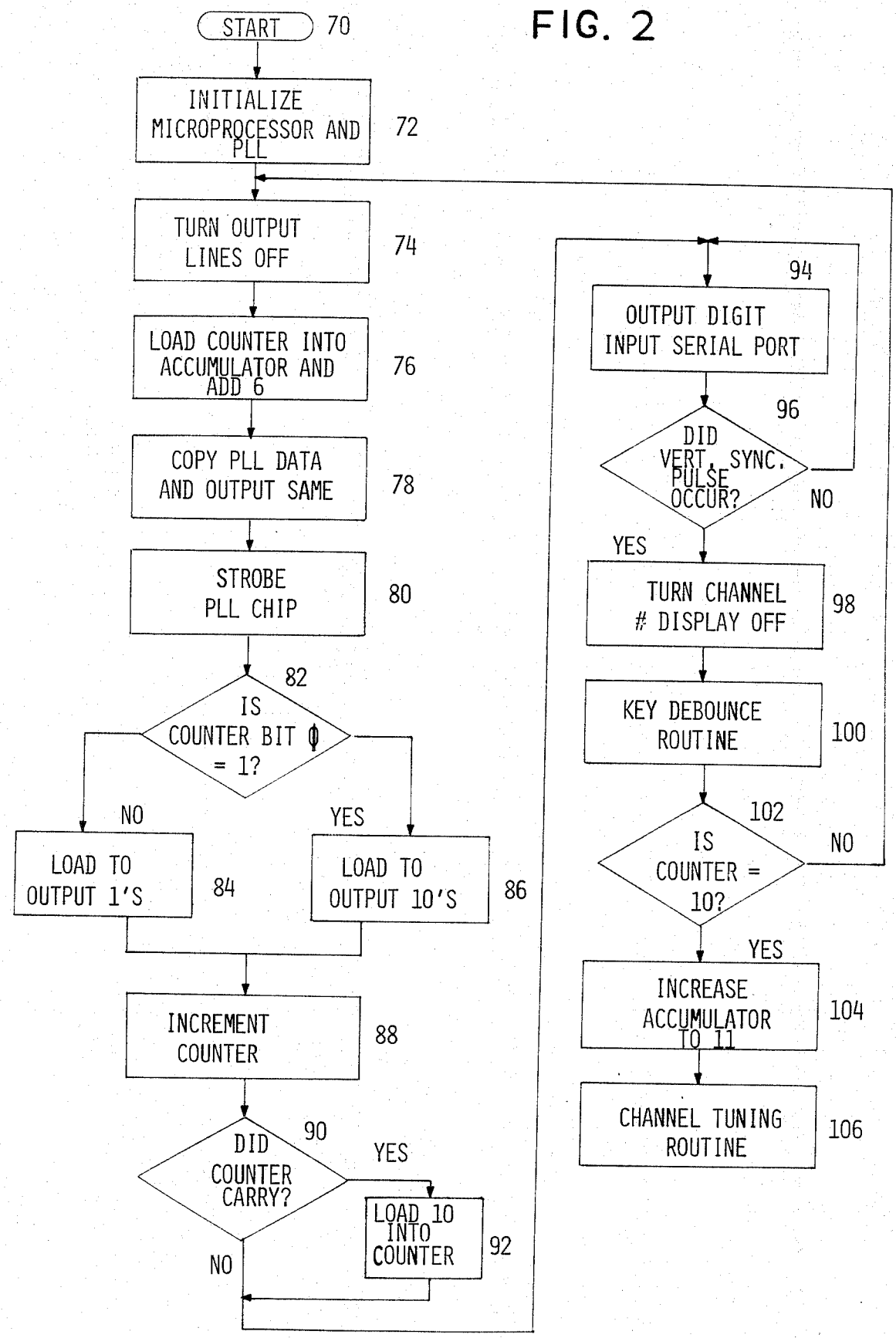
FIG. 2 is a flow chart depicting the logic employed by the microprocessor of FIG. 1.

Referring to FIG. 2, the operation of the multiplexed keyboard scanning and channel number display system shown in FIG. 1 is initiated by a start instruction 70 executed in the microprocessor 20. The program stored in the microprocessor 20 then initializes the microprocessor and the phase locked loop (PLL) 18. Initialization of microprocessor 20 causes the data memory (RAM) and registers therein and the PLL 18 to be cleared to zero in step 72. An external RC network and a diode are coupled to the RESET pin 17 of the microprocessor to provide the required power supply rise time for microprocessor initialization.

The program next turns the output lines from the microprocessor off by disabling the output ports numbered 1, 3, 4, 5, 6, 19 and 20 in step 74. In instruction 76, the contents of a designated counter are provided to the microprocessor's accumulator to which is added a hexadecimal 6 for the storage of a designated data table in the accumulator. The contents of the accumulator are then copied into an output register in the microprocessor which is coupled to output port 9 thereof and is provided to the divider and phase detector 18 in step 78.

The divider and phase detector 18 includes five input registers utilized in converting the data output by the microprocessor to digital tune words and fine tuning information. Data is output from pins 3, 4, 5 and 6 of microprocessor 20, while address information is provided from pins 1, 19 and 20 of the microprocessor to the divider and phase detector 18. These same seven pins, and leads coupled thereto, are utilized to drive the seven segments of each of the units and tens LEDS in the channel number display 46. From this information, the divider and phase detector 18 generates appropriate tuning information which is provided to either the UHF or VHF tuner 10, 12. Following the transfer of tuning information from the microprocessor 20 to the divider and phase detector 18, a data valid signal is provided in step 80 from output port 9 to the divider and phase detector 18 in providing verification that valid tuning information has been provided to the divider and phase detector circuit 18. Upon receipt of the data valid signal, the divider and phase detector 18 processes the data inputs provided thereto and provides appropriate tuning information to one of the aforementioned respective tuners.

The contents of the divider and phase detector 18 is thus regularly updated with current tuning information. This avoids the necessity for a special routine to update the divider and phase detector when a new channel number is selected since the tuning information provided to the tuners is updated in a continuous manner. In addition, voltage surges in the television receiver caused, for example, by cathode ray tube 15 arcing, which might disrupt microprocessor operation are also compensated for since the tuning output data from the microprocessor 20 is regularly updated in refreshing the

TABLE I

Instruction Set For Microprocessor

| 000 | 00 | 33 | 60 | 1C | 72 | 70 | 70 | 61 | 69 | 0C | 22 | 00 | 30 | 44 | 04 | 00 |
|---|---|---|---|---|---|---|---|---|---|---|---|---|---|---|---|---|
| 010 | 30 | 44 | 06 | 33 | 60 | 28 | 05 | 50 | 56 | 44 | 33 | 3C | 22 | 33 | 65 | 4F |
| 020 | 44 | 32 | 4F | 28 | 01 | EA | 1D | 00 | 55 | ED | 1C | 00 | 54 | BF | 00 | 28 |
| 030 | 05 | 51 | F5 | 00 | 5A | 06 | 2F | 33 | 6C | 05 | 4F | 57 | F9 | 60 | 5B | 00 |
| 040 | 3F | 06 | 5B | 4F | 66 | 6D | 7D | 07 | 7F | 67 | 40 | 0F | 0E | 0D | 0B | 07 |
| 050 | 80 | 86 | DB | CF | E6 | ED | FD | 87 | FF | F1 | BF | 33 | 60 | 00 | 0E | 5B |
| 060 | 21 | E5 | 3E | 70 | 00 | 2F | 33 | 3A | 2E | 33 | 3C | 33 | 64 | 0E | 33 | 2A |
| 070 | 33 | 60 | 51 | 60 | 90 | 40 | 13 | 60 | 89 | 03 | FC | 31 | 06 | 4B | 00 | 0D |
| 080 | 21 | 60 | 09 | 3C | 25 | 24 | 25 | 06 | A1 | 03 | 60 | 7B | 5C | 44 | 60 | 7C |
| 090 | 3E | 35 | 55 | D0 | 00 | 0D | 21 | 9A | 61 | 0A | 59 | 1D | 21 | BD | 51 | 28 |
| 0A0 | 21 | 60 | 13 | 51 | 3E | 21 | B6 | 2A | 21 | AB | BD | 00 | 29 | 22 | 30 | 44 |
| 0B0 | 04 | 00 | 30 | 44 | 06 | A1 | 2A | 00 | 21 | C3 | 29 | 21 | C3 | 0C | 70 | 70 |
| 0C0 | 7F | 60 | 83 | 29 | 32 | 40 | 30 | 44 | 04 | 00 | 40 | 30 | 44 | 06 | 60 | 13 |
| 0D0 | 43 | 00 | 21 | 60 | 75 | 0B | 5C | 06 | 00 | 54 | BF | 33 | 64 | 2F | 33 | 3A |
| 0E0 | 0B | 33 | 2A | 33 | 60 | 51 | F3 | 51 | 30 | EB | CE | 06 | 00 | 3E | 05 | 53 |
| 0F0 | 06 | 0B | D8 | 5F | 44 | 40 | 5C | 51 | 53 | 44 | 3E | 31 | 36 | 7F | 3E | 00 |
| 100 | 5A | 21 | C4 | 70 | 0D | 22 | 00 | 21 | 61 | 44 | 3E | 05 | 54 | EA | 1E | 21 |
| 110 | E1 | 1D | 05 | 57 | D6 | DD | 51 | DB | 1C | 05 | 5D | 61 | 4F | 1C | 72 | 70 |
| 120 | F9 | 00 | 28 | 01 | 51 | 1E | 31 | 06 | 60 | 13 | 51 | FB | 1E | 21 | E1 | 1D |
| 130 | 21 | F5 | 1C | 52 | 21 | 61 | 5B | 73 | 78 | 61 | 68 | 5B | 44 | 1D | 07 | 7A |
| 140 | 0D | 71 | 60 | 13 | 3E | 05 | 55 | CB | 00 | 60 | 9A | 05 | 1C | 06 | E9 | 1C |
| 150 | 22 | 00 | 56 | 30 | 5A | 44 | 04 | 00 | 30 | 44 | E8 | 1C | 32 | 00 | 40 | 30 |
| 160 | 5A | 44 | 04 | 00 | 40 | 30 | 44 | 04 | 71 | 1C | 25 | 24 | 25 | 06 | 0C | 70 |
| 170 | 70 | 7F | 00 | 28 | 7A | 73 | 75 | 72 | 73 | 70 | 70 | 7F | 3D | 21 | 61 | AD |
| 180 | 50 | 33 | 3E | 51 | 3C | 21 | CF | 51 | 50 | 33 | 3E | 2B | 72 | 7F | EB | 51 |
| 190 | 21 | D3 | EB | 51 | 21 | D9 | 2B | 75 | EB | 51 | 21 | DF | 2B | 78 | EB | 51 |
| 1A0 | 21 | E5 | 2B | 7D | EB | 51 | 21 | F4 | 2B | 70 | 74 | 60 | 13 | 51 | 21 | F6 |
| 1B0 | 3C | 05 | 32 | 5C | 61 | C0 | 00 | 52 | 50 | 33 | 3E | 2B | 78 | 7D | 61 | C8 |
| 1C0 | 00 | 51 | 50 | 33 | 3E | 2B | 79 | 75 | 2B | 00 | 32 | 53 | 30 | 44 | 04 | 00 |
| 1D0 | 30 | 44 | 04 | 00 | 30 | 06 | 3C | 00 | 40 | 30 | 5A | 44 | 04 | 00 | 40 | 30 |
| 1E0 | 44 | 06 | 00 | 21 | C8 | 07 | 21 | C8 | 1C | 25 | 24 | 25 | 06 | 60 | 13 | 00 |
| 1F0 | 00 | 00 | 00 | 00 | 00 | 00 | 00 | 00 | 00 | 00 | 00 | 00 | 00 | 00 | 00 | 00 | tuning information in the divider and phase detector circuit 18.

The contents of the aforementioned counter in the microprocessor are then checked, and if bit zero therein is 1 the program executes a routine in step 86 for insuring that the channel number information output therefrom is provided to the tens digit in the LED display 46. If the counter bit zero is not equal to 1, the program executes a subroutine in step 84 for providing the channel number information output therefrom to the 1's digit of LED display 46. The tens digit and units digit on/off switching control information is provided from pin 18 of microprocessor 20 to NPN transistors 48, 50 for switching operation as previously described. Key select information is provided to LED display 46 by microprocessor 20 during the vertical interval for driving the LED display and presenting a selected channel number during the active electron beam 17 scan of the television receiver's CRT 15.

In step 88 the microprocessor's counter is incremented by adding 15 (F in hexadecimal notation) to the contents thereof resulting in 1's being provided to the accumulator of the microprocessor. If the contents of the counter previously included any 1's, a carry will be executed, which is detected in step 90 causing 10 to be loaded into the counter at step 92. If the counter does not execute a carry following the incrementing of its contents by adding 15 thereto, the program does not load 10 into the counter. In either case, whether 10 is loaded into the counter or not, the program then detects the receipt of any keyboard inputs from input ports 11, 12 and 13, processes these input control signals, and prepares to transmit them via output ports 1, 3, 4, 5, 6, 19 and 20 to the LED display 46 in step 94. The program next looks for the receipt of a vertical synchronization pulse from input terminal 66 via the microprocessor's input pin 7 at step 96. If a vertical sync pulse is not detected, the program loops back to step 94, monitors the control inputs from keyboard 22, and prepares to output appropriate LED segment control signals to the LED display 46 during the vertical retrace interval. This vertical sync detection control loop allows the present invention to utilize a microprocessor which does not have an "Interrupt" capability which is typically used to inform the microprocessor of an external event, such as the occurrence of vertical sync as in the present invention. Thus, the present invention is compatible with some of the less expensive, more readily available microprocessor IC's.

If a vertical sync pulse is detected at pin 7, the program turns the LED display 46 off by providing a logic low to the base of transistor 52 via output pin 8 rendering transistor 52 nonconducting and the LED display 46 OFF at step 98. Following the turn off off of the LED display, the program executes a selector key debounce routine 100 which is conventional in nature and involves inserting a predetermined time interval in the program timing in order to insure that a valid key entry has occurred.

Following execution of the selector key debounce routine 100, the program next senses the contents of the microprocessor's counter at step 102. If the contents of the counter is 10, indicating that its previously loaded value has not changed, the program senses that a key has not been selected and executes a loop back to step 74 where the microprocessor's output ports are disabled, its accumulator contents are updated, and then provided to the divider and phase detector 18. If the contents of the microprocessor's counter is 10 indicating that a change has occurred as a result of control input signals received at microprocessor input ports 11, 12 or 13, the program next provides an 11 to the microprocessor's accumulator at step 104 in order to determine whether the key selected represents a tens or units digit entry. This value is then compared with the digit entered via keyboard 22, and if the two values match, this indicates that the second of the two channel numbers has been entered and the program enters into a channel tuning routine at step 106. Providing 11 to the microprocessor's accumulator is established by the use of the digit 9 which is given the value 11 in the program stored in microprocessor 20. As described in the aforementioned related patent entitled "Tuning System For A Television Receiver", filed in the name of the present inventor, initial selection of the digit 9 results in the immediate execution of a fine tuning routine, whereas initial selection of any digit other than 9 followed by selection of the second channel number digit, results in the television receiver being coarse tuned to the selected channel number. The details of the unique use of the individual selector keys on keyboard 22 and the execution of the coarse and fine tuning routines described in the referenced patent do not form a part of the present invention and are not further described herein.

The foregoing description relates to the operation of a television receiver controlled by a microprocessor in which multiplexed keyboard scanning and channel number display operation is performed during the vertical interval in order to eliminate digital switching noise from the video signals provided to the television receiver's cathode ray tube. This multiplexed signal approach permits the same pins on the microprocessor IC to be used for keyboard scan, tuning system control and LED channel number display in reducing system cost and complexity.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective against the prior art.

I claim:

1. In a television receiver including a keyboard for entering a selected number, a channel number display for presenting a selected channel number, and a video display wherein a video image is generated by the repetitive sequential vertical and horizontal sweep of an electron beam on said video display wherein the vertical sweep of said electron beam is initiated by a vertical pulse occurring within a vertical retrace interval during which said video display is blanked, a method for detecting and displaying a selected channel number comprising:

detecting a vertical pulse;
   scanning said keyboard in response to the occurrence of said vertical pulse during said vertical retrace interval for detecting a selected channel number thereon; and providing said selected channel number detected by the scanning of said keyboard to said channel number display for presenting said selected channel number thereon during the electron beam sweep of said video display.

2. The method of claim 1 wherein said keyboard includes a plurality of selector keys and wherein the scanning of said keyboard includes the steps of sequentially providing a scan signal to each of said selector keys and detecting the engagement of a selector key in response thereto.

3. The method of claim 1 wherein said channel number display includes a first display element for presenting units digit information and a second display element for presenting tens digit information and wherein said units digit information and said tens digit information are provided to a respective display element during successive vertical retrace intervals in an alternating manner.

4. The method of claim 1 wherein said television receiver further includes a tuning system responsive to tune words for tuning said television receiver to a selected channel number, said method further comprising the step of providing said tune words to said tuning system during said vertical retrace interval.

5. The method of claim 1 further comprising the steps of turning said channel number display OFF during said vertical retrace interval and turning said channel number display ON during electron beam sweep of said video display.

6. In a television receiver wherein the vertical sweep of an electron beam is initiated by a vertical pulse occurring within a vertical retrace interval during which said television receiver is blanked, a system for detecting and displaying user initiated channel number entries comprising:

selector means responsive to user input commands for generating a first signal representing a selected channel number;

signal processing means coupled to said selector means and responsive to said vertical pulse in said television receiver for generating a scan signal and providing said scan signal to said selector means during the television receiver's vertical retrace interval in detecting said first signal and for generating a display signal representing and in response to said detected first signal; and display means coupled to said signal processing means and responsive to said display signal for presenting said selected channel number.

7. A system as in claim 6 wherein said selector means comprises a multiple key control panel with said scan signal including a plurality of sense signals provided to respective keys on said control panel in detecting the engagement of selective ones of said keys.

8. A system as in claim 6 wherein said display means includes first and second multi-segment LED displays for respectively presenting tens and units information thereon with said display signal including a plurality of LED segment illuminating components.

9. A system as in claim 8 further including switching means in said signal processing means for sequentially in an alternating manner coupling said first and second LED displays thereto during successive vertical intervals whereby said tens and units information are alternately displayed in between successive vertical intervals.

10. A system as in claim 6 further including switching means coupled to said display means for turning said display means OFF during said vertical retrace interval and for turning said display means ON in between successive vertical retrace intervals.

11. In a television receiver, a system for detecting user initiated control inputs and displaying channel numbers corresponding to some of said control inputs comprising:

selector means responsive to said user initiated control inputs for generating first signals representing a selected channel number;

display means responsive to second signals for presenting a selected channel number thereon; and a single signal processor coupled to said selector means and to said display means by a plurality of connecting pins for providing a plurality of keyboard scan signals to said selector means for detecting said first signals, for generating and providing said second signals representing said selected channel number to said display means in response to the detection of said first signals by means of said same plurality of connecting pins, and for multiplexing said scan and second signals on said plurality of connecting pins.

12. The system of claim 11 wherein said plurality of connecting pins further couple said signal processing means to a tuning system in said television receiver for providing channel tuning information thereto, wherein said channel tuning information is multiplexed on said connecting pins with said scan and second signals.

13. The system of claim 11 wherein the multiplexing of said scan and second signals on said connecting pins occurs during a vertical retrace interval of said television receiver.

* * * * *